United States Patent [19]

Morikawa et al.

[11] Patent Number: 4,608,464
[45] Date of Patent: Aug. 26, 1986

[54] INTERFACE CIRCUIT INTERCONNECTING A BIDIRECTIONAL TWO-WIRE LINE WITH UNIDIRECTIONAL FOUR-WIRE LINES

[75] Inventors: Yuichi Morikawa, Mitaka; Hirohiko Sato, Iruma; Eiichi Amada, Kokubunji; Toshiro Suzuki, Hachiouji; Hirotoshi Shirasu, Yokohama; Hiroshi Kuwahara, Kodaira, all of Japan

[73] Assignees: Nippon Telegraph & Telephone Public Corporation; Hitachi, Ltd., both of Tokyo, Japan

[21] Appl. No.: 605,904

[22] Filed: May 1, 1984

Related U.S. Application Data

[63] Continuation of Ser. No. 291,938, Aug. 11, 1981, abandoned.

[30] Foreign Application Priority Data

Aug. 15, 1980 [JP] Japan ................................ 55-111689

[51] Int. Cl.[4] ............................ H04B 3/20; H04B 1/58
[52] U.S. Cl. ............................ 179/170.2; 179/170 NC; 179/170.6
[58] Field of Search .......... 179/170 NC, 170.2, 170.6, 179/170.8, 170 T

[56] References Cited

U.S. PATENT DOCUMENTS

| | | | |
|---|---|---|---|
| 3,787,645 | 1/1974 | Ochiai et al. | 179/170.2 |
| 3,828,147 | 8/1974 | Ochiai et al. | 179/170.2 |
| 4,232,400 | 11/1980 | Yamamoto et al. | 179/170.2 |
| 4,275,270 | 6/1981 | de la Plaza | 179/170.2 |

FOREIGN PATENT DOCUMENTS 123243  9/1980  Japan ................................ 179/170.2

OTHER PUBLICATIONS

K. Ochiai, T. Araseki, T. Ogihara; "Echo Canceller with Two Echo Path Models"; IEEE Transactions on Communications; vol. Com. 25; No. 6; Jun. 1977; pp. 589-595.

Primary Examiner—Gene Z. Rubinson
Assistant Examiner—Randall P. Myers
Attorney, Agent, or Firm—Antonelli, Terry & Wands

[57] ABSTRACT

In an interface circuit which couples a two-wire line of bidirectional transmission and unidirectional four-wire receiving and transmitting lines; in order to permit the interface circuit to operate in adaptation to the fluctuation of an impedance with the two-wire line side viewed from the four-wire receiving line, the four-wire receiving line is provided with a plurality of filters and a group of switches for selecting the filters, an output of the four-wire transmitting line is compared with outputs obtained by scanning the filters, and the filter providing the minimum output difference in the comparisons is selected and connected.

2 Claims, 12 Drawing Figures

INTERFACE CIRCUIT INTERCONNECTING A BIDIRECTIONAL TWO-WIRE LINE WITH UNIDIRECTIONAL FOUR-WIRE LINES

This is a continuation of application Ser. No. 291,938 filed Aug. 11, 1981, now abandoned.

FIELD OF THE INVENTION

This invention relates to an automatic interface circuit, and more particularly, to an interface circuit interconnecting a bidirectional two-wire line and a four-wire line having a unidirectional receiving line and a unidirectional transmitting line. More specifically, the invention relates to a circuit which is automatically adapted to a two-wire transmission line without employing a hybrid transformer.

BACKGROUND OF THE INVENTION

Usually, a hybrid circuit for use in a telephone transmission system and the like employs a hybrid transformer, which is used to transfer onto a two-wire line side a signal arriving from a four-wire receiving line and to transfer a signal from the two-wire line to a four-wire transmitting line. In a hybrid circuit of this type, in order to prevent the four-wire input signal from leaking to the four-wire transmitting line, a balancing network is used which has an impedance equal to the impedance of the two-wire line side as viewed from the hybrid transformer. The impedance of the two-wire line side, however, changes or fluctuates depending upon the type and length of the line, the type of telephone set connected at the terminal end of the line, etc. In addition, the impedance of the line varies depending upon the frequency of the transmission. It is therefore difficult to realize a circuit which is applicable to many types of two-wire lines.

As a solution to this problem, it has been proposed to juxtapose a plurality of hybrid circuits having balancing networks and to select the optimum one. This measure, however, has not been put into practical use because it results in a large-sized apparatus having a high cost of manufacture.

SUMMARY OF THE INVENTION

It is accordingly an object of this invention to provide an interface circuit which can be automatically adapted to various two-wire side impedances.

Another object of this invention is to realize a hybrid circuit interconnecting a bidirectional two-wire line and a four-wire line having a unidirectional receiving line and a unidirectional transmitting line, which permits monolithic LSI implementation employing MOS technology or the like, without using a hybrid transformer.

In an interface circuit according to this invention, a unidirectional receiving line is connected with a bidirectional two-wire line through a buffer amplifier and a terminal impedance. The bidirectional two-wire line is connected with a unidirectional transmitting line through a subtractor. One of a plurality of filters each having a different transfer characteristic is selectively connected between an output terminal of the buffer amplifier and one input terminal of the subtracter. A filter controller is disposed between an output terminal of the subtracter and the filters. The filter controller selects one filter having the optimum transfer characteristic which is the filter producing a voltage closest to a voltage appearing at a node of the two-wire line and the terminal impedance. The output of the selected filter is subtracted from the voltage of the node present added to one input terminal of the subtracter by application to another terminal of the subtracter, thereby to cancel any leakage.

According to this invention, the undesirable leakage signal from the two-wire/four-wire node to the four-wire transmitting line is canceled by the output of the filter, so that no hybrid transformer is required. Further, the characteristic of the filter circuit is automatically controlled to the optimum against the fluctuation of the impedance of the two-wire line side, so that the interface circuit device can be universalized, with the result that the single interface circuit device can cope with various kinds of subscribers' lines.

Further, the filters and their driver circuits are readily applicable to LSI implementation by the use of MOS technology as apparent from embodiments to be described later, and expedients effective for the miniaturization of the device and the reduction of the cost thereof are provided.

Other objects and further features of the invention will be apparent from the following detailed description when read in conjunction with the accompanying drawings.

DETAILED DESCRIPTION OF THE PREFERRED EMBODIMENTS

Figure 1:
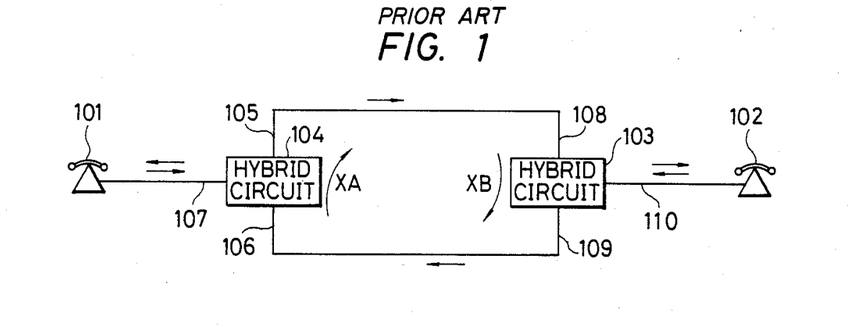
FIG. 1 is a schematic diagram of a system employing hybrid circuits.

FIG. 1 shows the general construction of a system involving transformer-type hybrid circuits. For the sake of brevity, it illustrates a transmission line between two terminal telephone sets 101 and 102. A signal from the telephone set 101 is transmitted to the other telephone set 102 via a two-wire line 107 capable of bidirectional transmission, a hybrid circuit 104, a four-wire transmitting line 105 coupled to the hybrid circuit 104, a four-wire receiving line 108 coupled to the other hybrid circuit 103 and a two-wire line 110. Likewise, a signal from the telephone set 102 is transmitted to the telephone set 101 via the two-wire line 110, the hybrid circuit 103, a four-wire transmitting line 109, a four-wire receiving line 106, the hybrid circuit 104 and the two-wire line 107.

With such a hybrid circuit, in the case where the impedance $Z_B(w)$ of the balancing network of the hybrid transformer is equal to the impedance $Z_L(w)$ of the two-wire line side viewed from the hybrid transformer, all the signals from the four-wire receiving line side are transmitted to the two-wire line side. However, when the impedances are not equal, leakage components $X_A$ and $X_B$ to the four-wire transmitting line side arise and cause ringing and near ringing in the system.

Figure 2:
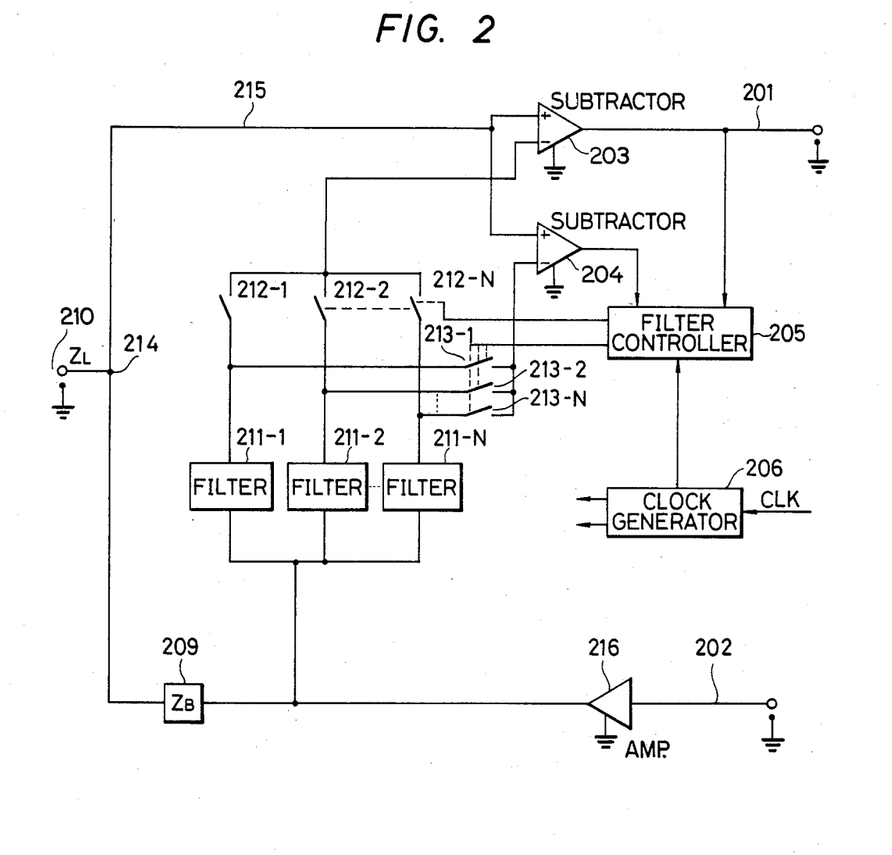
FIGS. 2 and 3A are block diagrams of embodiments of an interface circuit according to this invention.

FIG. 2 is a circuit diagram which shows the construction of an embodiment of an automatic interface circuit according to this invention. Referring to the figure, a four-wire unidirectional receiving line 202 is connected to a bidirectional two-wire line 210 through a buffer amplifier 216 (which has a gain of 6 dB for compensating for loss), a terminal impedance 209 (value $Z_B$) and node 214 (junction with ground reference). On the one hand, the two-wire line 210 is connected to a four-wire unidirectional transmission line 201 through the node 214, conductive line 215 and subtracter 203.

The output of the amplifier 216 is also supplied to a plurality of filter circuits 211-1, 211-2, ... and 211-N connected in parallel with one another. A line 215 on the four-wire transmitting line side, which extends from the node 214, is connected to the positive terminals of two subtracter circuits 203 and 204 connected in parallel with each other. The negative terminal of the subtracter circuit 203 is connected to the filter circuits 211-1, 211-2, ... and 211-N through a group of switches 212-1, 212-2, ... and 212-N. Also, the negative terminal of the subtracter 204 is connected to the filter circuits through another group of switches 213-1, 213-2, ... and 213-N.

Outputs from the two subtracter circuits are applied to a filter controller 205, which drives the group of switches so as to perform operations to be described later. The output line 201 of the subtracter 203 is finally coupled to the transmission line as the four-wire transmitting line of the interface circuit. A timing signal generator or clock generator 206 supplies necessary timing signals to the filter controller 205, the filter circuits, and the like, the connections of which are omitted from the illustration for the sake of brevity.

Bidirectional two-line 210 is adapted to be connected to a subscriber line through a conventional coupling mechanism not illustrated. The subscriber line is balanced and the transmitting line 201 and the receiving line 202 are unbalanced. The interface circuit of the present invention is the circuitry of FIGS. 2, 3A and 10.

In the above construction, letting $Z_L$ denote the impedance of the two-wire line side viewed from the node 214 and $V_{in}$ denote a four-wire input voltage, or output voltage of the buffer amplifier 216, the voltage $V_{out}$ which is generated on the four-wire transmitting line side from the node 214, or input of the subtracter, becomes:

$$V_{out} = \frac{Z_L}{R + Z_L} V_{in}$$

Accordingly, when a voltage equal to the voltage $V_{out}$ is separately produced and subtracted on the transmitting line 215, no undesirable four-wire input signal appears on the four-wire transmitting line 201. Therefore, it becomes unnecessary to use the hybrid transformer having a balancing network whose impedance is equal to the two-wire line side impedance $Z_L$. As regards signals from the two-wire line side, no signal is generated on the side of the filter circuits 211 because the impedance of the buffer amplifier 216 is very small.

In order to produce the voltage $V_{out}$ for the correction, a circuit (filter) having a transfer function:

$$Hi(w) = \frac{Z_L(w)}{R + Z_L(w)} \quad (3)$$

is disposed on the output side of the amplifier 216. The filter circuits 211-1, ... and 211-N are circuits having these transfer functions, and correspond to various two-wire line side impedances.

Among the plurality of filters, the circuit having the optimum characteristic is selected as follows. In the groups of switches 212-1 to 212-N, 213-1 to 213-N, only the switches 212-1 and 213-2 are first closed to select the filter circuits 211-1 and 211-2. Outputs of these filter circuits are respectively subtracted by means of the subtracters 203 and 204, and the average voltages of the outputs are determined by a decision circuit included in the filter controller 205. The filter circuit having the lower average voltage is desirable.

In the case where the average voltage of the output of the subtracter 203 is lower, the switch 212-1 is held in the "on" operating state, the switch 213-2 is turned "off", and the switch 213-3 is turned "on". Thus, a second comparison is made between the output of the subtracter 203 and the output of the subtracter 204 on the basis of the outputs of filters 211-1 and 211-3. In the case where the average voltage of the output of the subtracter 204 is lower, the switch 212-1 is turned "off", and the switch 212-2 is turned "on". Further, the switch 213-2 is turned "off", and the switch 213-3 is turned "on", whereby another comparison is made.

When, as described above, a filter circuit is selected on the basis of a comparison of the average voltage of the subtracter 203 to that of the subtracter 204 until the output of subtracter 203 is made lower by manipulation of the group of switches 212-1 to 212-N and the filter circuits are shifted and compared one by one by means of the group of switches 213-1 to 213-N, the optimum filter can be selected by (N−1) comparing operations even in the worst case.

Figure 3A:
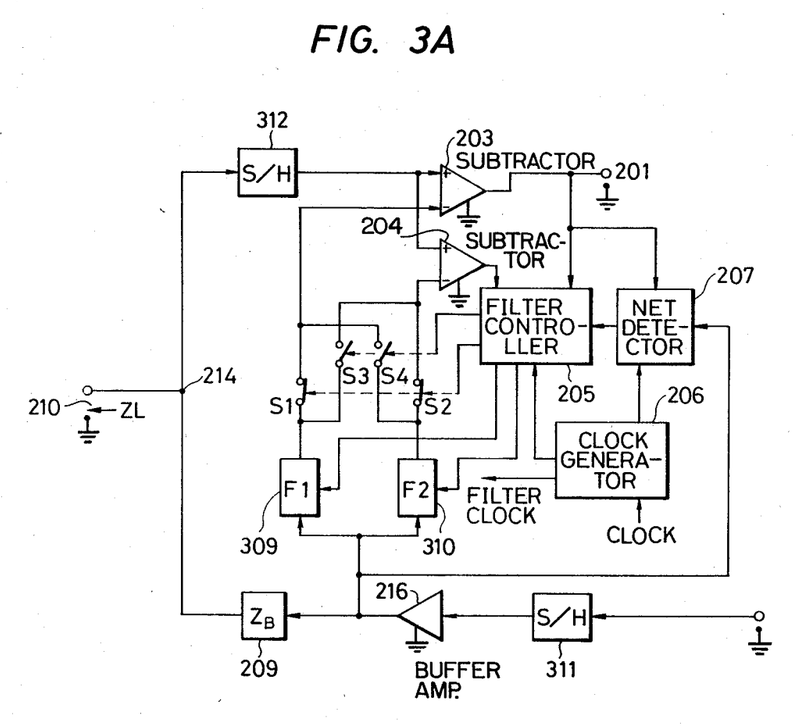
Figure 3B:
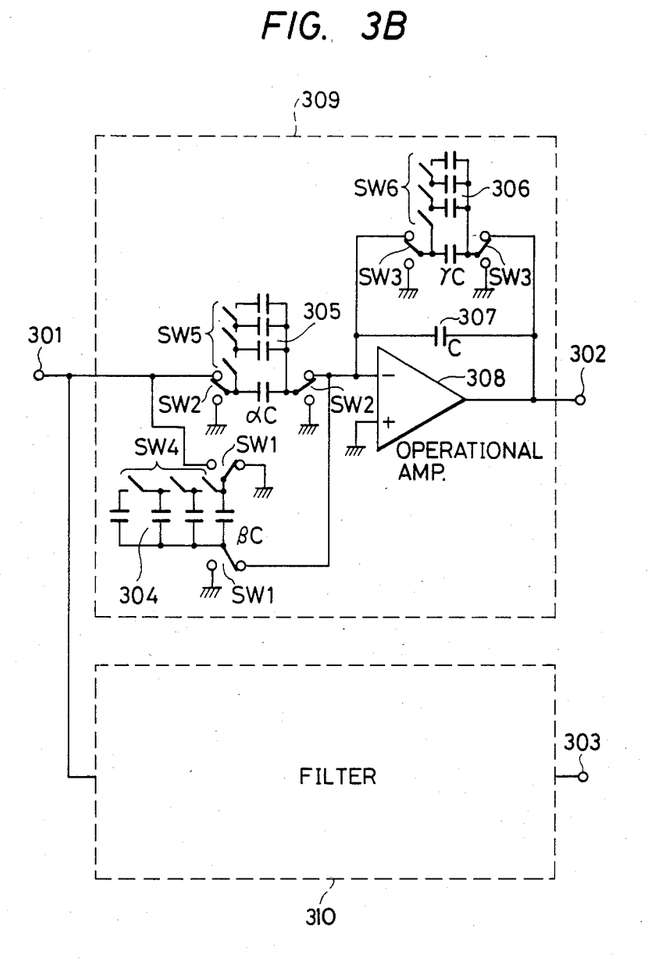
FIG. 3B is a circuit diagram of an embodiment of a filter circuit of the type used in FIG. 3A.

While, in the embodiment of FIG. 2, the example in which the large number of filters are arranged in parallel has been illustrated in order to facilitate an understanding of the basic operation of the present invention, a circuit arrangement as shown in FIG. 3A is preferable. In this figure, parts are assigned the same numerals as parts in FIG. 2 which have the same arrangements and functions, and so, an explanation of these parts will not be repeated. Switches S1 and S4 schematically represent the group of switches 212-1 to 212-N, while switches S2 and S3 schematically represent the group of switches 213-1 to 213-N. In this embodiment, each of the filters 309 and 310 is constructed of a combination of switched capacitors (capacitors whose terminals are provided with high-speed switches and which are periodically charged and discharged) and an operational amplifier, as shown in FIG. 3B. By changing-over the values of the plurality of switched capacitors, the same functions as those of the plurality of filters in FIG. 2 are performed. In order to operate the switched capacitors, the line 215 are respectively provided with sample-and-hold circuits 311 and 312. A net detector 207 is also provided and will be described later.

In FIG. 3B, the filters 309 and 310 have the same construction. A common input terminal 301 of these filters is connected to the the output terminal of buffer amplifier 21b in FIG. 3A, and output terminals 302 and 303 are respectively connected to the negative input terminals of the subtracters (comparators) 203 and 204 in FIG. 3A. Only the filter 309 will be discussed in detail, since the filter 310 has the same construction. Between the input terminal 301 and the negative input terminal of the operational amplifier 308, the switched capacitor combination 305 of variable capacitance (capacitance value $\alpha C$) changed-over by the switch SW2 is connected. The positive input terminal of the operational amplifier 308 is grounded. Between the output terminal 302 and the negative input terminal, a fixed capacitance element (capacitance value C) 307 and the switched capacitor combination 306 of variable capacitance (capacitance value $\gamma C$) changed-over by the switch SW3 are connected in parallel. The switched capacitor combination 304 of variable capacitance (capacitance value $\beta B$) is changed-over by the switch SW1 between the input terminal 301 and ground and between the negative input terminal and ground.

Letting $Z = e^{j\omega T}$, the transfer function H(z) of the filters is:

$$H(z) = -\frac{\frac{\alpha}{1+\gamma} - \frac{\beta}{1+\gamma} z^{-1}}{1 - \frac{1}{1+\gamma} z^{-1}} \quad (4)$$

and the transfer function of a 1/1 order can be realized. T represents the period (sampling period) in which the switches are driven. As the filters approximating Equation (3), ones of this degree are sufficient, and more complicated characteristics can be approximated by raising the order.

As the variable capacitance values $\alpha C$, $\beta C$ and $\gamma C$, capacitance elements disposed in parallel as shown in the figure are properly connected by changing-over the switches SW4, SW5 and SW6 on the basis of the operations of the decision circuit in the filter controller 205, whereby optimum filter circuits are formed. The switches are readily realized with MOS transistors. According to the present filter circuit arrangement, circuits having various filter characteristics can be realized with a very small-sized integrated circuit.

Figure 4:
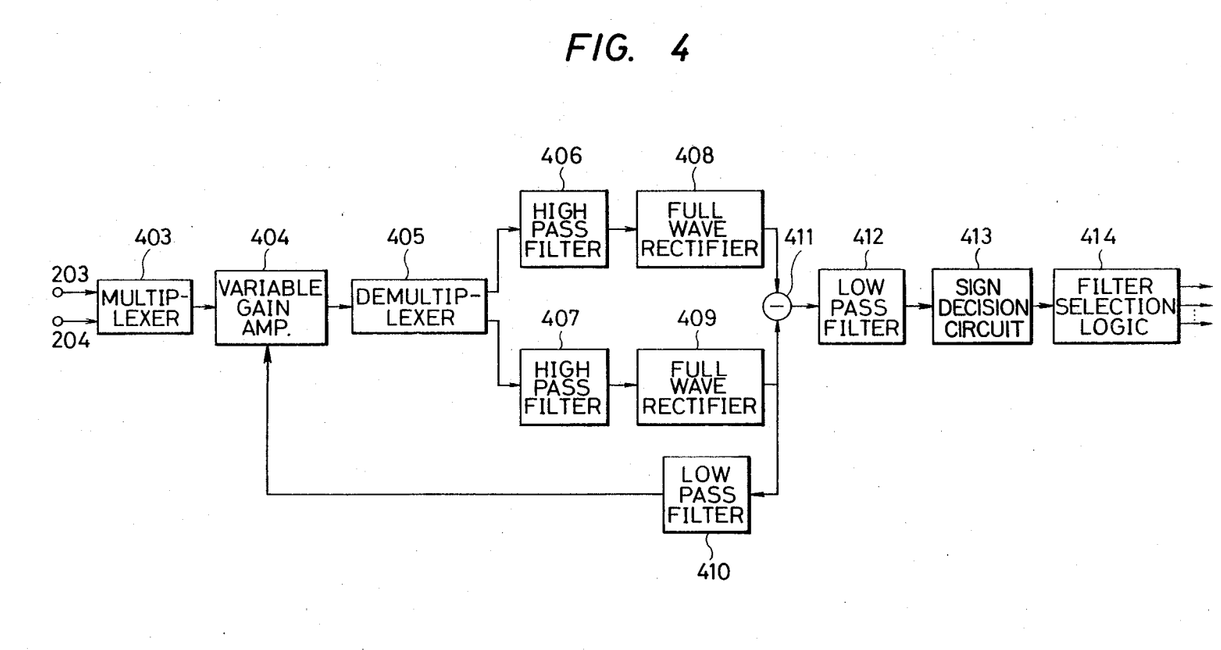
FIG. 4 is a block diagram showing an embodiment of a filter controller of the type used in FIG. 2.

FIG. 4 shows the construction of an embodiment of the filter controller 205 shown in FIGS. 2 and 3A. The outputs of the subtractors 203 and 204 in FIGS. 2 and 3A are applied to a multiplexer 403. The subtracter outputs are multiplexed in time division in the multiplexer 403, and are amplified by a variable gain amplifier 404. This serves to make the comparison of the average voltages precisely even when the voltage $V_{in}$ is at a low level. The gain of the amplifier 404 is controlled by an output of a low-pass filter 410 so that the output D.C. level of the filter 410 may fall within a prescribed range. When two amplifiers are used for the respective outputs of subtracters 203 and 204 in place of multiplexer 403 and single amplifier 404, erroneous operation is possible due to the difference of the gains of the two amplifiers. The multiplexed operation of the single amplifier serves to avoid this possibility of error.

Figure 5:
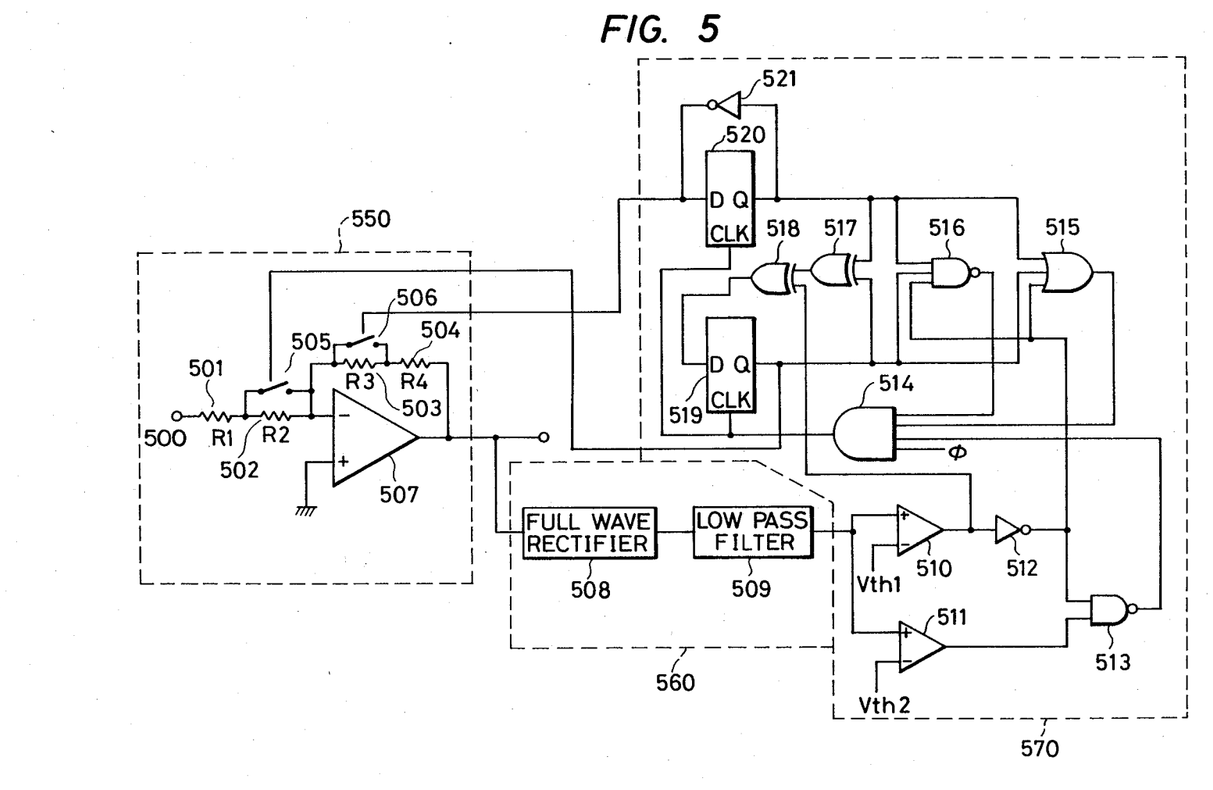
FIG. 5 is a block diagram of an embodiment of a variable gain amplifier as provided in FIG. 4.

FIG. 5 shows the construction of an embodiment of the variable gain amplifier 404. While the amplifier is used to amplify two signals in a multiplexed manner in the circuit of FIG. 4, a case of amplifying a single signal will be treated in order to simplify the description. As shown in FIG. 5, the embodiment is constructed of an amplifying stage 550, an amplitude detecting stage 560 and a controlling stage 570. The amplifying stage 550 consists of resistance elements 501 and 502 which are connected in series between the negative input terminal of an operational amplifier 507 and an input terminal 500, resistance elements 503 and 504 which are connected between the negative input terminal and output terminal of amplifier 407, and switches 505 and 506 which are disposed in parallel with the resistors 502 and 503, respectively, and are turned "on" and "off" by control signals C2 and C1, respectively. When the resistance values of the respective resistance elements are denoted by $R_1$, $R_2$, $R_3$ and $R_4$ as indicated in the figure, the amplifying stage 550 can be varied to have four levels of gain:

$$b = \frac{R_4}{R_1}, \; d = \frac{R_3 + R_4}{R_1}, \; a = \frac{R_4}{R_1 + R_2} \text{ and } c = \frac{R_3 + R_4}{R_1 + R_2}$$

(where a<b<c<d).

The amplitude detecting stage 560 consists of a full-wave rectifier 508 and a low-pass filter 509, and detects the average amplitude of a signal applied thereto. When this stage is replaced with, e.g., a peak detector, automatic gain control (AGC) can be provided so as to bring the peak value of the signal into a certain range (these elements 508 and 509 correspond in function to rectifiers 408 and 409 and the low-pass filter 410 in FIG. 4).

The controlling stage 570 consists of comparators 510 and 511 and logic circuitry for detecting an average amplitude level. D-type flip-flops 519 and 520 constitute a 2-bit counter, the countup and countdown operations of which are controlled by six gates 514, 515, 516, 517, 518 and 521. The reference voltages $V_{th1}$ and $V_{th2}$ of the comparators 510 and 511 determine the upper limit and lower limit of a desired amplitude range ($V_{th1} > V_{th2}$). It is supposed that the relationships among the statuses of the control signals $C_1$ and $C_2$ and the available levels of gain of the amplifier 550 are as listed in Table 1.

TABLE 1

| C1 | C2 | Gain |
|---|---|---|
| "L" | "L" | a |
| "H" | "L" | b |
| "L" | "H" | c |
| "H" | "H" | d |

Four statuses are considered as the outputs of the comparators, and operations at those times become as listed in Table 2 with reference to Table 1.

TABLE 2

| | $V_{110}$ | $V_{111}$ | meaning | required operation |
|---|---|---|---|---|
| (1) | "L" | "L" | $V < V_{th2}$ | countup |
| (2) | "H" | "L" | never happen | |
| (3) | "L" | "H" | $V_{th2} < V < V_{th1}$ | no operation |
| (4) | "H" | "H" | $V > V_{th1}$ | countdown |

Here, V denotes the output voltage of the filter 509, and $V_{110}$ and $V_{111}$ denote the outputs of the respective comparators 510 and 511.

The gain variation of the AGC operation is controlled by a clock signal $\phi$, which is applied to one input of AND gate 514, and the gain is changed by the rise of the signal $\phi$. The output of a NAND gate 513 becomes "L" in only the case (3) in Table 2. This output is applied to the AND gate 514, and inhibits passage of the clock $\phi$ through the gate 514 to fix the gain. The voltage $V_{110}$ is applied to the EX-OR gate 518, and controls the countup and countdown operations. The NAND gate 516 serves to hinder the countup operation when the counter stages 519 and 520 are at "H" and "H" (maximum gain) (if the countup begins from the "H" and "H" statuses, the "L" and "L" statuses will arise). Thus, the output of gate 516 becomes "L" to inhibit passage of the clock $\phi$ through gate 514 only in the case where $V_{110}=$"L", $Q_{519}=$"H" and $Q_{520}=$"H" ($Q_{519}$ and $Q_{520}$ denote the outputs of the respective flip-flops 519 and 520). On the other hand, the OR gate 515 hinders the countdown operation in the case where the counter stages 519 and 520 are "L" and "L" (minimum gain). That is, the output of gate 515 becomes "L" to inhibit passage of the clock $\phi$ through gate 514 only in the case where $Q_{519}=$"L", $Q_{520}=$"L" and $V_{110}=$"H".

In this circuit arrangement, the difference in level between $V_{th1}$ and $V_{th2}$ or D-20 $\log_{10}(V_{th1}/V_{th2})$ needs to be greater than all the gain differences d-c, c-b, and b-a. Unless this condition is fulfilled, the gain of the AGC does not become fixed even for a fixed input amplitude. Assuming by way of example that the gains are a=0 dB, b=5 dB, c=10 dB and d=15 dB and that the level difference is D=3 dB, when a signal of an amplitude lower by 1 dB than $V_{th2}$ has entered, the counter counts up, and the output of the low-pass filter 509 becomes 1 dB higher than $V_{th2}$. Then, in turn, the counter counts down. Due to the repetition of such operations, the gain oscillates, and it becomes impossible to bring the AGC output into the desired range.

According to this circuit arrangement described above, owing to the large number of digital portions, LSI implementation is easy and simple AGC circuitry can be utilized. It is also easy to increase the available number of steps or levels of the gain.

Referring back to FIG. 4, the output of the variable gain amplifier 404 is divided into two signals by a demultiplexer 405 and then the divided signals are applied to high-pass filters 406 and 407, respectively. The high-pass filters eliminate an offset voltage (forming a cause for an erroneous decision) which developed in the variable gain amplifier 404, and their cutoff frequencies must lie below a transmission band (300–3,400 Hz). The outputs of the high-pass filters are rectified by the full-wave rectifiers 408 and 409. The difference of the rectified outputs as produced at 411 passes through a low-pass filter 412, and the sign of the D.C. component is determined by a sign decision circuit 413. The result is applied to a filter selection logic circuit 414, which drives the groups of switches of the filter circuits as described before.

The low-pass filter 412 can also be realized by use of a construction employing a switched capacitor arrangement. The response of the filter determines the interval of decision (the period of time from the change-over of the filter to the next change-over thereof). When, at the end of each decision, the capacitor arrangements of the filter are reset and the initial state is made 0, the influence of the preceding operation can be eliminated and the decision interval can be shortened.

Figure 6:
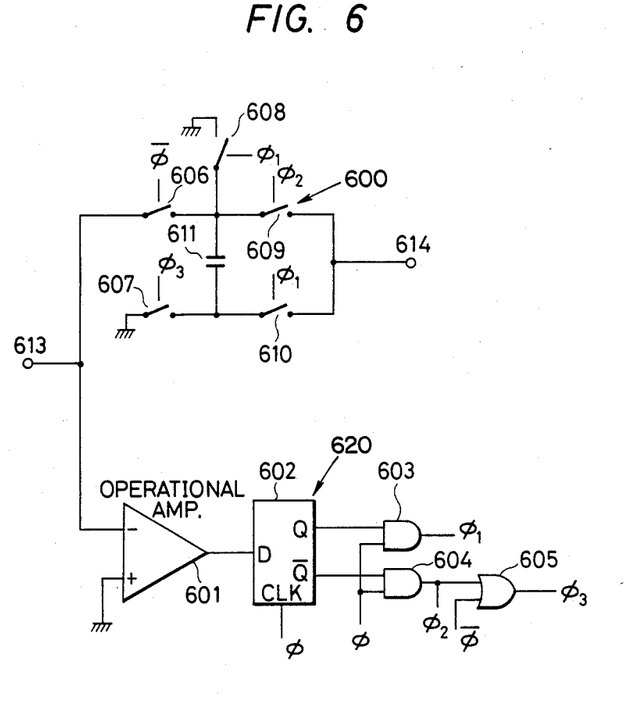
FIGS. 6 and 9 are diagrams each showing the construction of a rectifier of the type which may be used in FIGS. 4 or 5.

FIG. 6 is a circuit diagram of an embodiment of the full-wave rectifier 408 or 409 in FIG. 4 or the full-wave rectifier 508 in FIG. 5. Especially, the rectifier is made monolithic to facilitate integrated circuit implementation. In a prior art rectifier circuit, diodes and resistance elements have been used. However, since it is difficult to fabricate the diode using the conventional MOS process and the resistor of high precision requires a large area on a chip, the prior art rectifier circuit has had the disadvantage that the monolithic implementation by MOS technology is difficult. In the interface circuit of the present embodiment, the other principal circuits, such as the filters, the variable amplifier and the switching circuit can be integrated, as already described. Accordingly, the integrated circuit implementation of the rectifiers has an important significance in rendering the entire interface circuit small in size and low in cost. Of course, the rectifier to be described below is applicable, not only to the interface circuit of this invention, but also to other circuits for processing sampled data.

As shown in FIG. 6, the rectifier is constructed of a switching portion 600, including switched capacitor 611 and switches 607–610, depicted in the upper part of the figure, and a control circuit portion 620, depicted in the lower part of the figure, and which provides signals for driving the group of switches 607–610. The control circuit portion 620 consists of an operational amplifier comparator 601 whose negative terminal is coupled to an input terminal 613 and whose positive terminal is grounded, a D-type flip-flop 602, which logically compare the positive and negative outputs Q and $\overline{Q}$ of the flip-flop 602 and the clock signal, and an OR gate 605, which logically operates on the output of the AND gate 604 and the inverted clock signal $\overline{\phi}$. The driving switches 606, 607, 608, 609 and 610 of the switched capacitor are respectively turned "on" and "off" by the inverted clock signal $\overline{\phi}$, the output $\phi_3$ of the OR gate 605, the output $\phi_1$ of the AND gate 603, the output $\phi_2$ of the AND gate 604 and the output $\phi_1$ of the AND gate 603. Hereunder, the rectifying operation will be described for both positive and negative input signals.

Figure 7:
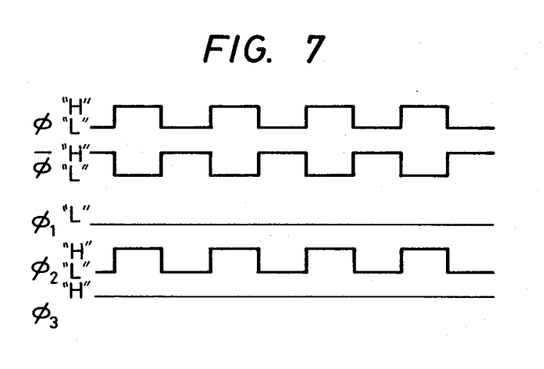
FIGS. 7 and 8 are time charts for explaining the operations of the rectifier.

In the case of a positive input signal, the input of the D-type flip-flop 602 becomes 0, so that its terminal Q becomes low (hereinbelow, indicated by "L"), while its terminal $\overline{Q}$ becomes high (hereinbelow, indicated by "H"). Therefore, the respective signals $\phi$, $\overline{\phi}$, $\phi_1$, $\phi_2$ and $\phi_3$ will be as shown in FIG. 7. Accordingly, the switches 608 and 610 are "off" and the switch 607 is "on", so that the switches 606 and 609 are alternately turned "on" and "off". When the switch 606 is "on" (that is, when $\overline{\phi}$ is "H"), the capacitor is charged, and when the switch 609 is "on" (that is, when $\phi_2$ is "H"), the charged voltage of the capacitor is derived as is from an output terminal 614.

Figure 8:
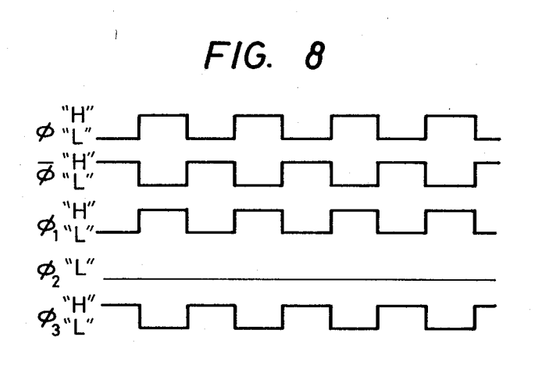

In the case of a negative input, the respective signals $\phi$, $\overline{\phi}$, $\phi_1$, $\phi_2$ and $\phi_3$ of the control portion 620 will be as shown in FIG. 8, in accordance with the same principle as already described. Accordingly, the switch 609 is always "off", the switches 606 and 608 are simultaneously turned on "on" (at this time, the switches 608 and 610 are turned "off"), and the input is applied to charge the capacitor 611. When the switches 606 and 608 are turned "off", the switches 608 and 610 are turned "on" and the potential of the capacitor 611 is derived from the output terminal 614. At this time, the potential is taken out from the opposite terminal to that for the positive input and therefore becomes a positive potential.

The input may be either a sampled-and-held signal or a continuous analog signal. In the latter case, a signal sampled at the time of the rise of the clock signal $\phi$ is rectified and becomes an output. Although the output can be derived only while the clock signal $\phi$ is "H", it can be derived over the whole section by adding a sample-and-hold circuit behind.

Figure 9:
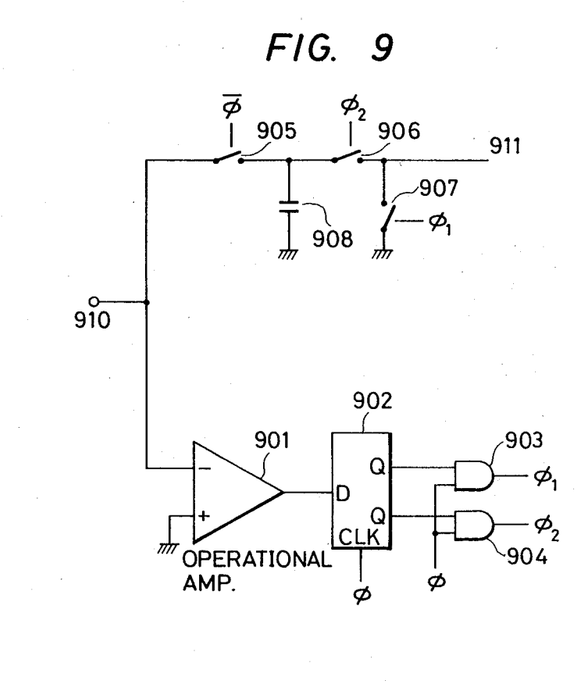

FIG. 9 shows another embodiment which is a half-wave rectifier circuit. Like the foregoing case of the full-water rectifier, when the input is positive, the signal $\phi_1$ is always "L" and the signal $\phi_2$ becomes the same as the clock signal. Therefore, switches 905 and 906 are alternately turned "on" and "off" and a switch 907 is always turned "off", so that a positive signal is derived from an output 911. When the input is negative, the signal $\phi_2$ is always "L", so that the switch 907 is turned "on" and the output becomes 0 volt irrespective of the switches 905 and 906. In this way, half-wave rectification is effected.

As described above in conjunction with the various embodiments, the automatic interface circuit of this invention can be automatically adapted to various two-wire line side impedances without employing any hybrid transformer. Further, LSI implementation is permitted with MOS integrated circuit technology, which is effective for the miniaturization and cost reduction of the circuit. Now back to FIG. 4, as described above, the output of low pass filter 412 provides the difference between the two absolute values of the outputs of the subtractor 411 is constructed so as to substract the value corresponding to output of substractor 203 from the value corresponding to output of subtractor 204, the sign or polarity of output of low pass filter 412 is positive when the absolute value of output of subtractor 203 is smaller than that of substractor 240.

Accordingly, sign decision circuit 413 detects the sign of the output signal of low pass filter 412, and filter selection logic circuit is driven by the output of low pass filter 412. In other words, sign decision circuit 413 detects which of the two output signals of comparators 203 and 204 is larger than the other by detecting the polarity of the output signal of the low pass filter 413. Filter selection logic circuit 414, by using the output signal representing the polarity, produces a driving signal for switches, by which two filters are selected and connected to subtractors 203 and 204 at the next comparing step. The sign decision circuit 413 may be formed by a well-known operational amplifier, and the filter selection logic 414 may be easily formed by a combinational logic circuit.

Figure 10:
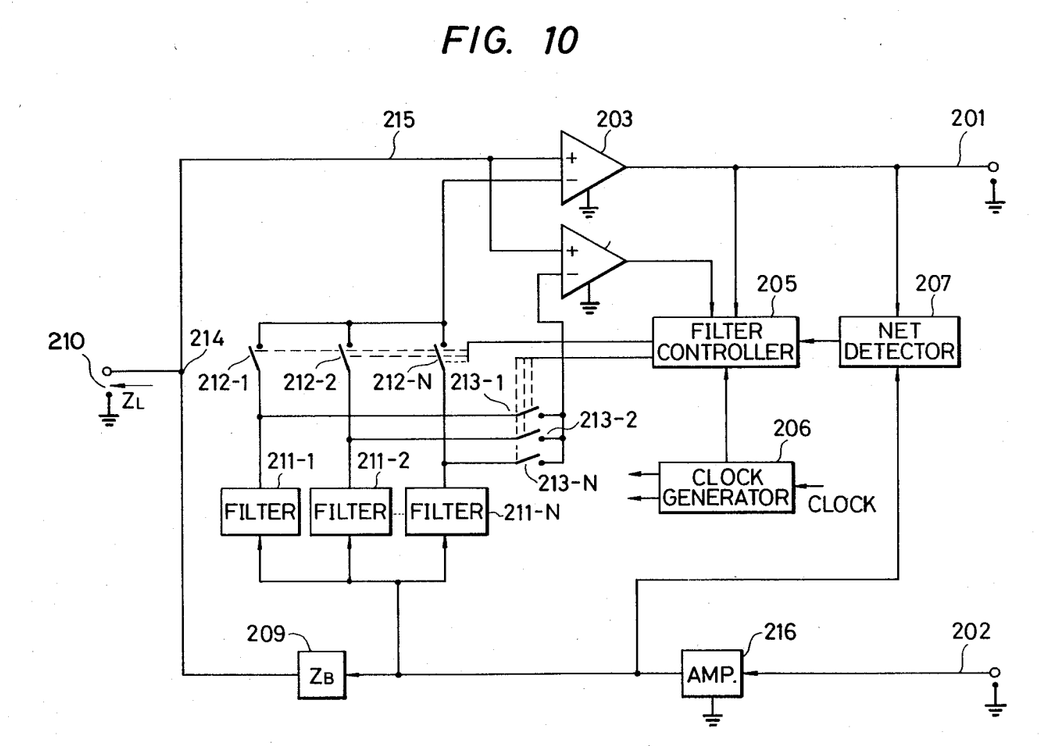
FIG. 10 is a block diagram of another embodiment of the hybrid interface circuit according to this invention.

FIG. 10 is a diagram which shows the construction of another embodiment of the automatic interface circuit according to this invention. In order to effectively perform the adaptive operation of the interface circuit even when two subscribers at transmitting and receiving ends are talking, the present embodiment is so constructed that the adaptive operation is hindered when a transmission signal or a signal from the telephone set 210 exists on the four-wire transmitting line. In the figure, parts having the same constructions as parts in FIG. 2 are assigned the same numerals. They will not be repeatedly explained. The present embodiment, like the embodiment of FIG. 3A, differs from the embodiment of FIG. 2 in that a net detector 207 is added.

It is desirable that the automatic interface circuit be capable of performing the adaptive operation even when the conversation of the talker and the listener is proceeding. However, when the signals of both the talker and the listener coexist, the signal of the telephone set 210 is superposed on the signal from the four-wire receiving line 202 in the filter controller 205. As a result, an error may occur in the decision operation. More specifically, in order to compare the average voltage values of the two inputs, the filter controller 205 rectifies the two inputs, takes the differences, executes low-pass filtering and decides the sign of the result. Letting A denote the signal from the two-wire line side, B denote the leakage from the four-wire input to the four-wire output, and C and D represent the two filter outputs connected to the negative input terminals of the two subtracters 203 and 204, the output obtained by rectifying the inputs and taking the difference in the filter controller 205 is $|A+B-C|-|A+B-D|$. Since this is ordinarily not equal to the value desired to be compared, $|B-C|-|B-D|$, a malfunction arises.

Figure 11:
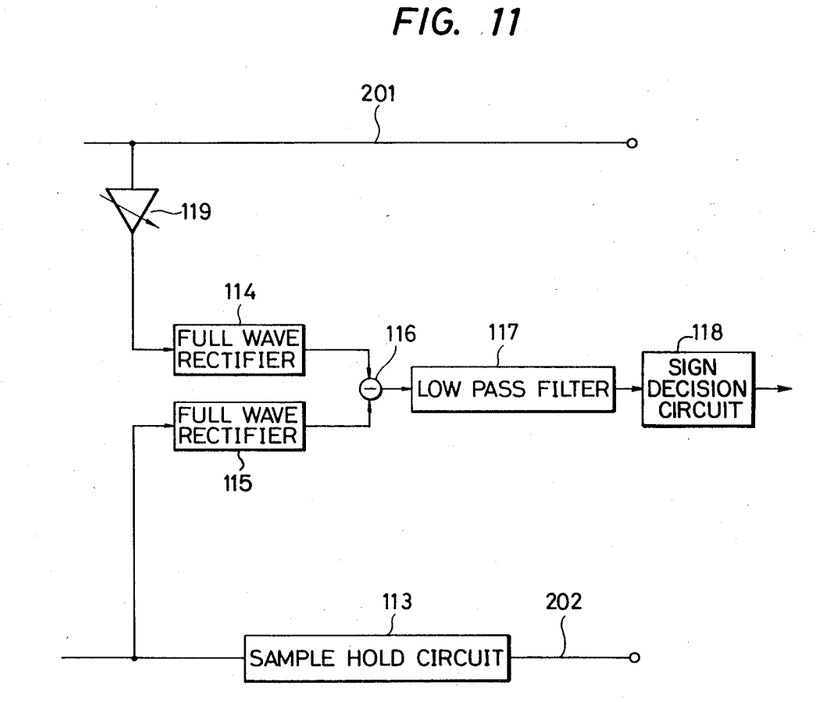
FIG. 11 is a schematic diagram of an embodiment of a net detector.

FIG. 11 shows an embodiment of the net detector 207. Numeral 202 designates a four-wire input, numeral 201 a four-wire output, and numeral 113 a sample-and-hold circuit. In the absence of a signal from the two-wire line side, a signal appearing on the four-wire output is only the leakage from the four-wire input, and hence, the average voltage value thereof is small as compared with that of the four-wire input. In the presence of the signal from the two-wire line side with its level being above a certain degree, this voltage appears on the four-wire output, and hence, the average voltage value thereof becomes greater than that of the four-wire input. Accordingly, the near-end-talker can be detected by comparing the average voltage values of the four-wire input and the output.

In FIG. 11, numerals 114 and 115 indicate rectifiers. The difference of their outputs is taken by a subtracter 116 and is subjected to low-pass filtering by a low-pass filter 117, whereupon the sign is decided by a sign decision circuit 118. Then, the talker can be recognized on the basis of the above principle. An attenuator 119 serves to adjust the sensitivity.

While this invention has been described above with reference to various preferred embodiments, it is not restricted thereto, but it can be subject to various design modifications within the scope of the appended claims.

What is claimed is:

1. An interface circuit for coupling a two-wire line with a four-wire line having a receiving line and a transmitting line to prevent a signal received from the receiving line from being transmitted to the transmitting line, comprising:
    a buffer amplifier having an input coupled to said receiving line and an output coupled to said two-wire line through a terminal impedance;
    a first and a second subtractor each of which has a first input coupled to said two-wire line and a second input, one of the subtractors having an output coupled to the transmitting line;
    a group of filters to be selectively connected between said output of said buffer amplifier and said second input of said first and second subtractors;
    filter selection means for selectively coupling a pair of filters from among said group of filters, respectively, to the second inputs of said first and second subtractors; and
    filter controller means for comparing the outputs of said first and second subtractors and for controlling said filter selection means so as to finally select a filter to minimize the leakage of a signal from said four-wire receiving line to said four-wire transmitting line.

2. An interface circuit in accordance with claim 1 wherein:
    (a) the group of filters consists of more than two filters; and
    (b) the filter selection means sequentially selects a different pair of filters after each comparison by the filter controller means with one of the pair of selected pair of filters for each comparison after a first comparison being one of the filters selected from a previous comparison which produced a minimum leakage of a signal from said four-wire receiving line to said four-wire transmitting line.

* * * * *